United States Patent
Ito et al.

(10) Patent No.: US 10,864,669 B2
(45) Date of Patent: Dec. 15, 2020

(54) MOLTEN-RESIN EXTRUSION DEVICE AND EXTRUSION METHOD AS WELL AS MOLTEN RESIN MOLDING MACHINE AND MOLDING METHOD

(71) Applicant: KYORAKU CO., LTD., Kyoto (JP)

(72) Inventors: Shuji Ito, Kanagawa (JP); Satoshi Masuda, Kanagawa (JP)

(73) Assignee: KYORAKU CO., LTD., Kyoto (JP)

(*) Notice: Subject to any disclaimer, the term of this patent is extended or adjusted under 35 U.S.C. 154(b) by 431 days.

(21) Appl. No.: 15/567,458

(22) PCT Filed: Apr. 20, 2016

(86) PCT No.: PCT/JP2016/062470
§ 371 (c)(1),
(2) Date: Oct. 18, 2017

(87) PCT Pub. No.: WO2016/171156
PCT Pub. Date: Oct. 27, 2016

(65) Prior Publication Data
US 2018/0104878 A1    Apr. 19, 2018

(30) Foreign Application Priority Data

Apr. 20, 2015  (JP) .................................. 2015-086008

(51) Int. Cl.
*B29C 48/25*   (2019.01)
*B29C 48/475*  (2019.01)
(Continued)

(52) U.S. Cl.
CPC .......... *B29C 48/252* (2019.02); *B29C 48/475* (2019.02); *B29C 49/041* (2013.01);
(Continued)

(58) Field of Classification Search
CPC .... B29C 48/475; B29C 48/252; B29C 49/041
See application file for complete search history.

(56) References Cited

U.S. PATENT DOCUMENTS

| 5,851,570 A | 12/1998 | Hayes |
| 2005/0133696 A1* | 6/2005 | Orrico ..................... G01D 5/34 |
| | | 250/214 PR |

(Continued)

FOREIGN PATENT DOCUMENTS

| JP | H06-166092 A | 6/1994 |
| JP | H08-258122 A | 10/1996 |

(Continued)

OTHER PUBLICATIONS

Machine translation of JPH08258122A (Year: 1996).*
International Search Report dated Jul. 19, 2016 of corresponding International application No. PCT/JP2016/062470; 5 pgs.

Primary Examiner — Timothy Kennedy
Assistant Examiner — Alexander A Wang
(74) Attorney, Agent, or Firm — Maier & Maier, PLLC

(57) ABSTRACT

Provided is a method for extruding molten resin in a charging space from a head by converting a rotational motion of an electric motor into a linear motion of a piston disposed in the charging space through a ball screw and thus causing the piston to move vertically, the charging space being a space into which the molten resin can be charged and formed in an accumulator, the head having an extrusion port at a lower end thereof. The method includes a step of separating an upper plate from a lower plate and retracting the upper plate upward by a rotational motion of the electric motor and then charging the molten resin into the charging space with a sufficient charging pressure to push up the piston against weights of the lower plate and the piston in the charging space, the lower plate being disposed over the accumulator and coupled to the piston from above, the upper (Continued)

plate being engaged with the electric motor through a screwing relationship and disposed over the lower plate so as to be able to surface-contact the lower plate and a step of extruding the molten resin from the extrusion port by moving the upper plate downward with the upper plate and the lower plate surface-contacting each other by a rotational motion of the electric motor and thus moving the piston downward in the charging space.

17 Claims, 13 Drawing Sheets

(51) Int. Cl.
*B29C 49/04* (2006.01)
*B29C 51/02* (2006.01)
*B29C 51/10* (2006.01)
*B29C 48/08* (2019.01)
*B29C 48/30* (2019.01)
*B29C 48/305* (2019.01)
*B29C 48/32* (2019.01)
*B29C 48/00* (2019.01)
*B29C 48/09* (2019.01)

(52) U.S. Cl.
CPC .......... *B29C 48/0017* (2019.02); *B29C 48/08* (2019.02); *B29C 48/09* (2019.02); *B29C 48/2694* (2019.02); *B29C 48/301* (2019.02); *B29C 48/305* (2019.02); *B29C 48/32* (2019.02); *B29C 49/04* (2013.01); *B29C 51/02* (2013.01); *B29C 51/10* (2013.01)

(56) References Cited

U.S. PATENT DOCUMENTS

2013/0066587 A1* 3/2013 Kalathil ................. G01D 5/06
  702/150
2017/0190118 A1* 7/2017 Mire ..................... B29C 48/475

FOREIGN PATENT DOCUMENTS

JP   H08258122 A  * 11/2008
JP   2013252643 A    12/2013

* cited by examiner

FIG. 12
FIG. 12A
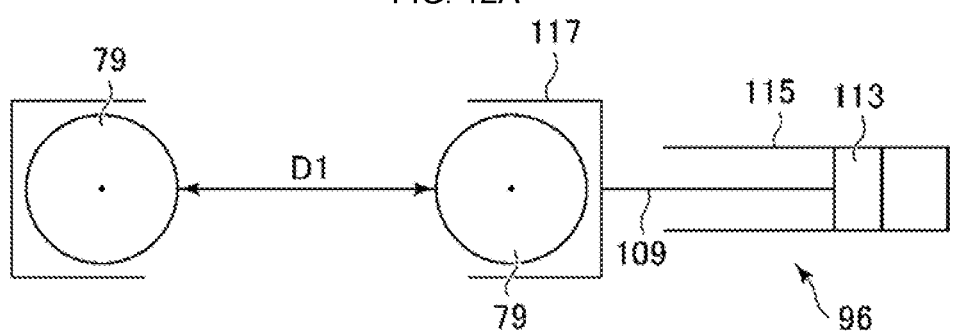
FIG. 12B
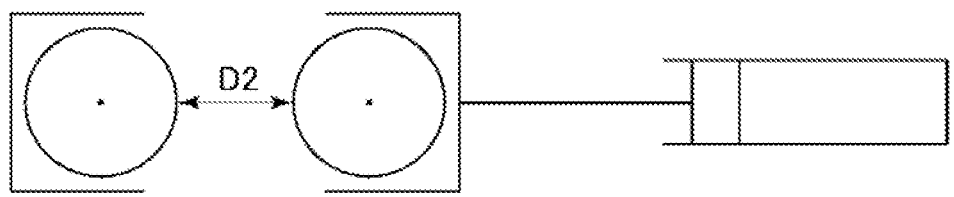

MOLTEN-RESIN EXTRUSION DEVICE AND EXTRUSION METHOD AS WELL AS MOLTEN RESIN MOLDING MACHINE AND MOLDING METHOD

TECHNICAL FIELD

The present invention relates to molten-resin extrusion technology and molten-resin molding technology.

BACKGROUND

To form a molded product from molten resin, there has been often used a technology that extrudes and then molds a parison. For example, Japanese Unexamined Patent Application Publication No. 8-258122 discloses a parison molding method using a blow molding machine and a parison molding machine which is a blow molding machine.

More specifically, the above literature discloses a parison molding method using a blow molding machine that injects a parison by pressing the cylindrical piston of an accumulator head using a piston rod. This method includes injecting a parison by converting a rotational motion of a motor into a linear motion using a screw member and thus pressing the piston rod.

The literature also discloses a parison molding machine which is a blow molding machine and which injects a parison by pressing the cylindrical piston of an accumulator head using a piston rod. This machine includes a support disposed on an upper portion of a housing to which a molten-resin feeding nozzle is connected, a pair of piston drivers disposed over a side surface of an upper portion of the support with brackets therebetween, and a rod mounting plate that is disposed on a lower portion of the support so as to be able to move vertically and has a pair of piston rods on a lower portion thereof. Each piston driver includes a motor, a screw shaft that is held by a bracket with a thrust bearing therebetween and is rotated by the motor, and a plate that is provided with a nut secured to the screw shaft and can move vertically. When the rod mounting plate is pressed by the plate, a parison is injected.

According to the above parison molding method using a blow molding machine and the parison molding machine which is a blow molding machine, a rotational motion of the motor is converted into a linear motion by the screw shaft and the nut mounted on the plate and thus the plate is pressed down. This pressing force is transmitted to the piston through the rod mounting plate and piston rod and thus the molten resin is pressed down and injected from a discharge port. Then, a cylindrical parison is molded. After the injection, the nut, nut holder, and plate can be raised to a predetermined position by rotating the motor backward.

While the parison molding method using a blow molding machine and the parison molding machine which is a blow molding machine can improve power consumption, noise, and contamination caused by oil compared to when molten resin is extruded by moving a piston using a hydraulic unit, there exist the following technical problems associated with the charging of molten resin.

The first problem is: the plate connected to the piston has a screwing relationship with an electric motor; therefore, even if molten resin is fed into an accumulator and the pressure of the molten resin in the accumulator is increased, the piston is not raised accordingly unlike when the piston is moved downward by rotating the electric motor, meaning that it is difficult to charge the molten resin.

The second problem is: even if the piston is previously retracted upward by rotating the electric motor, it is difficult to smoothly charge molten resin into the accumulator. More specifically, to smoothly charge molten resin into all parts of a charging space in the accumulator, it is necessary to store the molten resin in such a manner that the liquid level in the charging space is gradually raised while applying backpressure to the molten resin from above and pushing away the remaining air. Since retracting the piston upward makes the pressure in the charging space negative, it is difficult to smoothly charge the molten resin into all parts of the charging space without such backpressure even if the molten resin is charged into the charging space with increased pressure.

The third problem is: assuming that a molded product is repeatedly produced in each shot using extruded molten resin, if a sufficient amount of molten resin is not charged in the extrusion preparation step or it takes time to charge a sufficient amount of molten resin in that step, it may be difficult to efficiently perform molding in the subsequent molding step or molding failure may occur depending on the temperature or extrusion amount of the molten resin in that step.

SUMMARY

In view of the above technical problems, an object of the present disclosure is to provide a molten-resin extrusion method and machine that are able to smoothly charge molten resin to be extruded, into all parts of a charging space in an accumulator.

Also, in view of the above technical problems, an object of the present disclosure is to provide a molten-resin molding method and machine that are able to efficiently perform molding without causing a molding failure.

To accomplish the above objects, the present disclosure provides a method for extruding molten resin in a charging space from a head by converting a rotational motion of an electric motor into a linear motion of a piston disposed in the charging space through a ball screw and thus causing the piston to move vertically, the charging space being a space into which the molten resin can be charged and formed in an accumulator, the head having an extrusion port at a lower end thereof. The method includes a step of separating an upper plate from a lower plate and retracting the upper plate upward by a rotational motion of the electric motor and then charging the molten resin into the charging space with a sufficient charging pressure to push up the piston against weights of the lower plate and the piston in the charging space, the lower plate being disposed over the accumulator and coupled to the piston from above, the upper plate being engaged with the electric motor through a screwing relationship and disposed over the lower plate so as to be able to surface-contact the lower plate and a step of extruding the molten resin from the extrusion port by moving the upper plate downward with the upper plate and the lower plate surface-contacting each other by a rotational motion of the electric motor and thus moving the piston downward in the charging space.

According to the molten-resin extrusion method thus configured, the rotational motion of the electric motor is converted into the linear motion of the piston through the ball screw. Thus, in the accumulator provided with the charging space into which molten resin can be charged, the piston disposed in the charging space can be caused to move vertically; the molten resin can be charged into the charging space in the accumulator; and the charged molten resin can be extruded from the extrusion port formed at the lower end of the accumulator.

More specifically, the lower plate disposed over the accumulator and connected to the piston from above and the upper plate connected to the electric motor through the screwing relationship and disposed over the lower plate so as to be able to surface-contact the lower plate are disposed in a non-engaged state. In charging molten resin, the upper plate is separated from the lower plate and retracted upward by the rotational motion of the electric motor. In extruding the molten resin, on the other hand, the rotational motion of the electric motor is converted into downward linear motions of the lower plate and piston through the upper plate and thus the upper plate is moved downward with the upper plate and lower plate surface-contacting each other.

In particular, while molten resin is charged into the charging space, a lower portion of the molten resin in the charging space receives back pressure based on the weights of the lower plate and piston. For this reason, by setting the molten-resin charging pressure to a sufficient value to push up the lower plate, the molten resin is charged into the charging space while receiving resistance but pushing away the piston upward. Thus, the molten resin can be smoothly charged into all parts of the charging space in the accumulator.

To accomplish the above objects, the present disclosure provides a molten-resin extruder including an accumulator extending vertically and provided with a space coupled to a head, the head having an extrusion port at a lower end thereof, a piston that is fitted to the space and is able to move vertically in the space, wherein a charging space into which a molten resin can be charged is formed under the piston in the space, a lower plate disposed over the accumulator and coupled to the piston from above, level detector configured to detect a level of the lower plate, a screw shaft that extends vertically, an electric motor configured to rotationally drive the screw shaft, a nut secured to the screw shaft and capable of making a vertical reciprocating linear motion along the screw shaft, wherein the screw shaft is rotated around a vertical direction by the electric motor, and an upper plate coupled to the nut and disposed over the lower plate so as to be able to surface-contact the lower plate. After the upper plate is retracted upward by the electric motor, the molten resin is charged into the charging space while applying back pressure based on a self-weight of the lower plate to the molten resin in the charging space, and the charged molten resin is extruded from the extrusion port downward.

According to the present disclosure, molten resin is extruded by the driving force of the electric motor rather than hydraulic driving and then molded. Thus, as will be described using examples, it is possible to achieve the smooth charging of molten resin to be extruded into all parts of the charging space in the accumulator, which is a prerequisite to the extrusion of molten resin, without causing the technical problems associated with hydraulic driving.

First, it is only necessary to drive the electric motor when required in charging and extruding molten resin, allowing for significant energy savings.

Second, charging and extruding molten resin does not require the use of oil (hydraulic oil), allowing for the avoidance of the contamination of a molded product caused by oil leakage and oil mist and the prevention of a fire accident caused by the contact of oil with a heater.

Third, no hydraulic unit is used, allowing for reductions in noise.

Fourth, the electric motor is used, allowing for the improvement of accuracy of a molded product by performing feedback control. Also, maintenance is easy. Specifically, the cost and replacement time of oil-related consumable parts (packing, gasket, oil seal, etc.) are unnecessary.

BRIEF DESCRIPTION OF THE DRAWINGS

FIGS. 12A, 12B are schematic side views showing a pair of rollers of a resin molded product forming apparatus of the second embodiment and vicinities thereof.

DETAILED DESCRIPTION

1. First Embodiment

A first embodiment of the present invention will be described in detail with reference to FIGS. 1 to 6.

Figure 1:
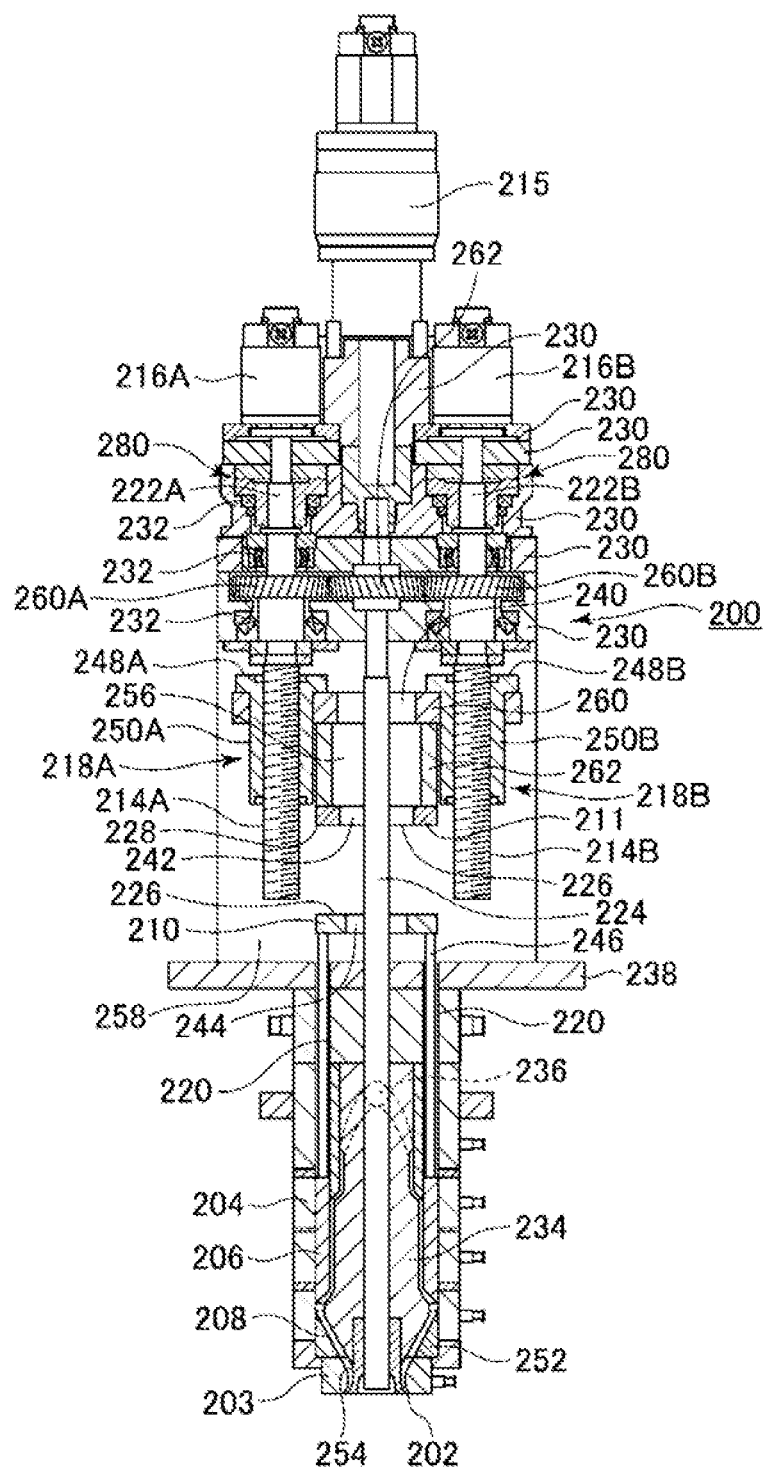
FIG. 1 is a partial longitudinal sectional view showing an embodiment of a molten-resin extruder.
Figure 2:
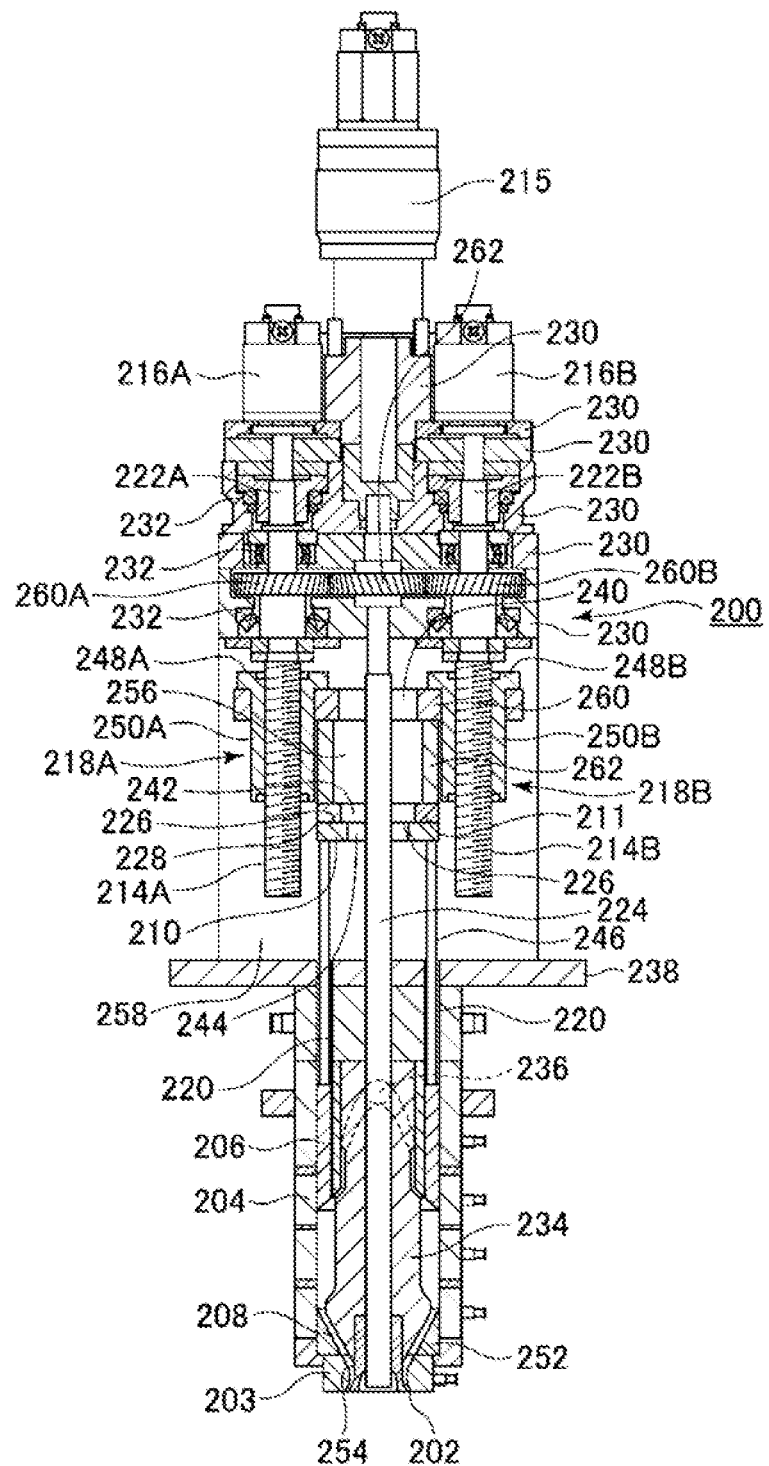
FIG. 2 is a drawing showing a state in which an upper plate is retracted to the upper limit position in the molten-resin extruder.
Figure 3:
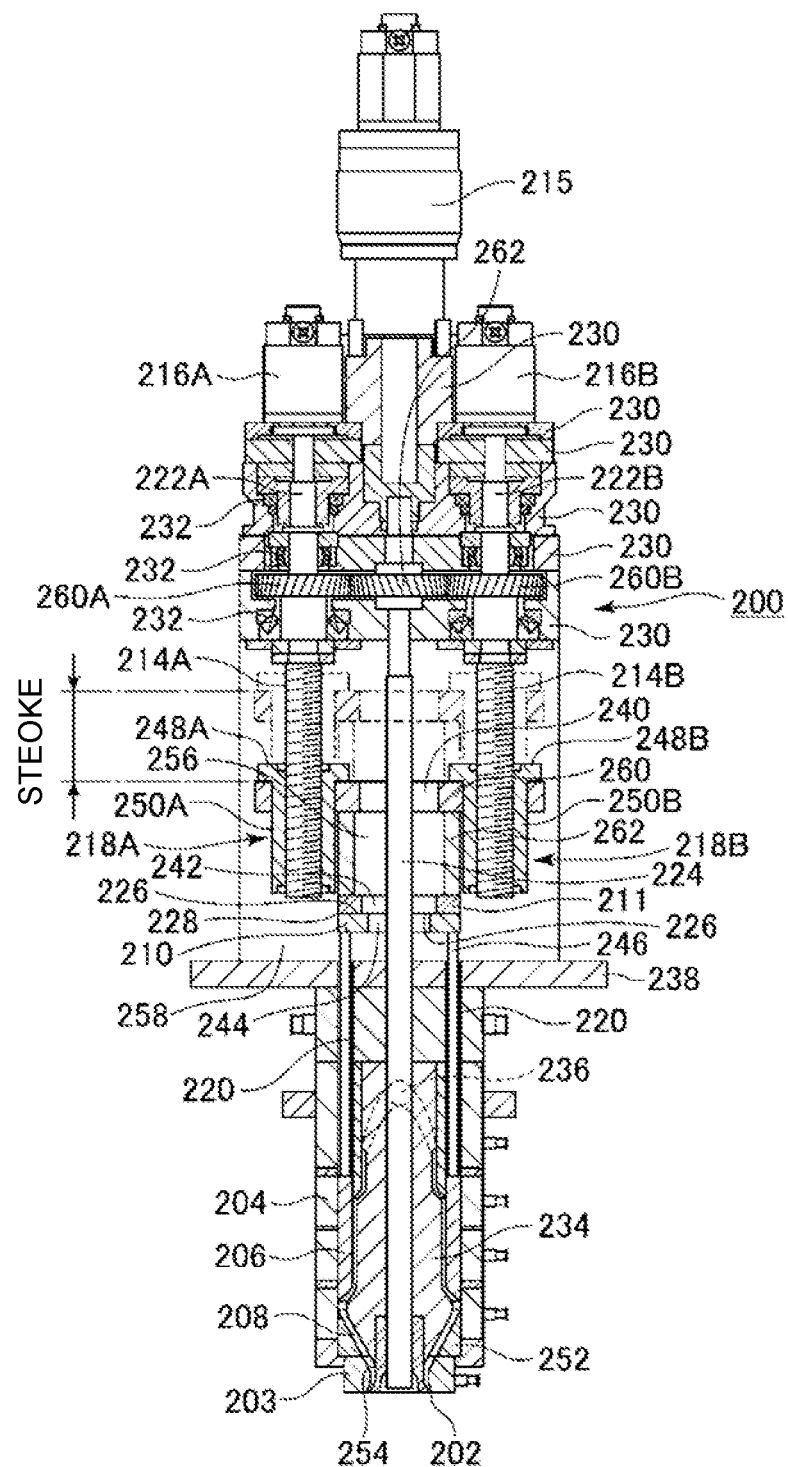
FIG. 3 is a drawing showing a state in which the upper plate and a lower plate are in contact with each other in the molten-resin extruder.

As shown in FIGS. 1 to 3, a molten-resin extruder 200 includes a driving unit disposed over a fixed plate 238 and a molten-resin extrusion unit disposed under the fixed plate 238.

The driving unit includes a pair of electric motors 216A, 216B relating to the vertical reciprocating linear motion of an upper plate 211 (to be discussed later) and an electric motor that adjusts the extrusion area of an extrusion port 202 (to be discussed later) of the extrusion unit. The electric motor 215 is disposed in the center, and one of the pair of electric motors 216A, 216B is disposed on each side of the electric motor 215. The electric motors 216A, 216B and electric motor 215 are preferably servo motors such as AC servo motors.

The pair of electric motors 216A, 216B are provided with shafts 222A, 222B that are coupled to motor shafts and extend downward. Lower portions of the shafts 222A, 222B are provided with ball screws 214A, 214B. The shafts 222A, 222B are supported by brackets 230 with bearings 232 therebetween so as to be rotatable around the vertical direction. The ball screws 214A, 214B are rotated by rotating the motors. The shafts 222A, 222B may be coupled to the motor shafts of the pair of electric motors 216A, 216B, for example, with keys and couplings therebetween. Note that precision reduction gears 280 reduce the rotational speeds of the motors.

As with the pair of electric motors 216A, 216B, the electric motor 215 is provided with a shaft 224 that is coupled to a motor shaft and extends downward. The shaft 224 extends to the extrusion unit through the center opening of the fixed plate 238. As with the pair of electric motors 216A, 216B, it is supported by a bracket 230 with a bearing 232 therebetween so as to be rotatable around the vertical direction by rotating the motor.

A space 258 is provided between the lowest bracket 230 and fixed plate 238. Disposed in the space 258 is a mechanism that converts the rotation of the pair of electric motors 216A, 216B into the vertical reciprocating linear motion of the upper plate 211 (to be discussed later). This mechanism includes ball nuts 218A, 218B secured to the ball screws 214A, 214B, a nut supporting plate 266 supporting the ball nuts 218A, 218B, a tube 262 concentrically fixed to the lower surface of the nut supporting plate 266, and an upper plate 211 concentrically fixed to the lower surface of the tube 262.

The ball nuts 218A, 218B include screw tubes 250A, 250B whose inner circumferential surfaces form screwing regions with the ball screws 214A, 214B. The screw tubes 250A, 250B have annular flanges 248A, 248B on upper portions thereof. The length of the ball nuts 218A, 218B, that is, the length of the screwing regions is preferably determined such that the ball nuts 218A, 218B, nut supporting plate 266, tube 262, and upper plate 211 make a vertical reciprocating linear motion integrally and stably by rotating the pair of electric motors 216A, 216B.

The nut supporting plate 266 has, in the center thereof, a center opening 240 through which the shaft 224 of the electric motor 215 passes contactlessly, as well as has openings supporting the ball nuts 218A, 218B. The sizes of the openings are set such that the screw tubes 250A, 250B are nonrotatably internally fitted to the nut supporting plate 266. Due to the annular flanges 248A, 248B, the ball nuts 218A, 218B are suspended from and supported by the nut supporting plate 266. The shafts 222A, 222B and shaft 224 are provided with gears 260A, 260B and a gear 264 that are engaged with each other. Preferably, the pair of electric motors 216A, 216B rotate in conjunction with each other through the gear 264, and the gear 264 is rotatably supported by the shaft 224.

Thus, the ball screws 214A, 214B of the shafts 222A, 222B rotate. As a result, the corresponding ball nuts 218A, 218B, nut supporting plate 266, tube 262, and upper plate 211 make a vertical reciprocating linear motion integrally and stably.

The shaft 224 of the electric motor 215 contactlessly passes through the center opening 240 of the nut supporting plate 266, a hollow 256 of the tube 262, and an opening 242 formed in the center of the upper plate 211 and then extends downward.

The extrusion unit includes a cylindrical housing 204 having a hollow and a core 234 disposed concentrically with the cylindrical housing 204. Formed between the inner circumferential surface of the cylindrical housing 204 and the outer circumferential surface of the core 234 is an annular charging space 208 that extends vertically. The charging space 208 contains a pair of piston rods 220 and a ring-shaped piston 206 coupled to the lower ends of the pair of piston rods 220.

The ring-shaped piston 206 has a shape complementary to that of the charging space 208. Since the ring-shaped piston 206 is internally fitted to the charging space 208, the charging space 208 for charging molten resin is formed under the ring-shaped piston 206.

The side circumferential surface of the cylindrical housing 204 is provided with a molten resin charging port 236. Molten resin charged through the molten resin charging port 236 flows into the charging space 208, and the ring-shaped piston 206 is moved toward the annular extrusion port 202 downward in the charging space 208. Thus, the molten resin charged in the charging space 208 is extruded from the extrusion port 202 downward in the form of a parison.

Note that the cylindrical housing 204 has a heater (not shown) mounted on the perimeter thereof.

An accumulator 205 serves as a molten-resin charging unit in the cylindrical housing 204. Disposed over the accumulator 205 is a lower plate 210 coupled to the ring-shaped piston 206 from above and level detector 212 that detects the level of the lower plate 210.

More specifically, the lower plate 210 is disposed in the space 258 and coupled to the upper end of the piston 206 through the piston rods 220 extending vertically in the charging space 208. The lower plate 210 has, in the central portion thereof, an opening 244 through which the shaft 224 of the electric motor 215 passes.

The upper plate 211 and lower plate 210 are disposed horizontally, and surface contact portions 226 thereof have the same circular shape. The upper plate 211 and lower plate 210 are positioned such that the peripheries 228 of the surface contact portions 226 of the respective plates match each other. Thus, as will be described later, when the upper plate 211 is moved downward and brought into contact with the lower plate 210 by rotating the pair of electric motors 216A, 216B, the upper plate 211 is completely overlaid on the lower plate 210 in such a manner that the surface contact portions 226 intimately contact each other (see FIG. 2). In other words, the upper plate 211 is disposed so as to be able to surface-contact the lower plate 210.

The level detector 212 includes magnets 245 disposed on the piston rods 220 and magnetic sensors 246 that are fixed near the piston rods 220 and convert changes in the magnetic fields of the magnets 245 into electric signals and output the signals. The magnetic sensors 246 detect the level of the lower plate 210 by detecting changes in the magnetic fields of the magnets 245 caused by the vertical motion of the piston rods 220, that is, the lower plate 210.

In a modification, the level detector 212 may be provided with infrared sensors that are fixed near the piston rods 220 and detect the levels of the piston rods 220 by detecting the radiant energy of infrared rays radiated from the piston rods 220 is equal to or higher than a predetermined level.

The core 234 has a structure symmetrical with respect to an annular shaft and is fixed to the lower end of the shaft 224 of the electric motor 215. The shaft 224 extends vertically on the center line of the cylindrical housing 204.

An extrusion head 203 is fixed to the lower end of the cylindrical housing 204 so as to be concentric with the cylindrical housing 204. The extrusion head 203 and the lower end of the core 234 form the extrusion port 202 communicating with the charging space 208. The shaft 224, that is, the core 234 can be moved vertically by rotating the electric motor 215 and thus the opening area of the extrusion port 202 is fine-adjusted.

As described above, the extruder 200 includes the accumulator 205 that extends vertically and is provided with the space coupled to the extrusion head 203 having the extrusion port 202 at the lower end 201 thereof and the piston 206 that is fitted to the space and can be moved vertically in the space. Thus, the charging space 208 into which molten resin can be charged is formed under the piston 206 in the space. The extruder 200 includes the lower plate 210 disposed over the accumulator 205 and coupled to the piston 206 from above, the level detector 212 that detects the level of the lower plate 210, the screw shafts 214 that extend vertically, the electric motors 216 that rotationally drive the screw shafts 214, the nuts 218 that are secured to the screw shafts 214 and can make vertical linear motions along the screw shafts 214 that are rotated around the vertical direction by the electric motor 216s, and the upper plate 211 coupled to the nuts 218 and disposed above the lower plate 210 so as to be able to surface-contact the lower plate 210. The extruder 200 is configured to charge molten resin into the charging space 208 by retracting the upper plate 211 using the electric motor 216 and then applying back pressure to the molten resin in the charging space 208 using the self-weight of the lower plate 210 and to extrude the charged molten resin from the extrusion port 202 downward.

In the present invention, a surface-material sheet obtained by molding molten resin is a sheet formed of polypropylene, engineering plastics, olefin-based resin, or the like.

More specifically, the material of the surface-material sheet is preferably a resin having high melt tension in terms of the prevention of variations in the thickness caused by draw-down, neck-in, or the like. Also, the material of the surface-material sheet is preferably a resin having high liquidity in order to obtain good transferability or trackability of the material to a die 73.

Specifically, the material is preferably a polyolefin (e.g., polypropylene, high-density polyethylene) which is a monopolymer or copolymer of an olefin such as ethylene, propylene, butene, isoprene pentene, or methyl pentene and whose MFR at 230° (measured at a test temperature of 230° and a test load of 2.16 kg in accordance with JIS K-7210) is equal to or less than 3.0 g/10 min, more preferably 0.3 to 1.5 g/10 min. Or, the material is preferably an amorphous resin, such as acrylonitrile-butadiene-styrene copolymer, polystyrene, high-impact polystyrene (HIPS resin), or acrylonitrile-styrene copolymer (AS resin), whose MFR at 200° (measured at a test temperature of 200° and a test load of 2.16 kg in accordance with JIS K-7210) is 3.0 to 60 g/10 min, more preferably 30 to 50 g/10 min and whose melt tension at 230° (a tension indicated when extruding a strand from an orifice having a diameter of 2.095 mm and a length of 8 mm at the remaining temperature of 230° and at an extrusion speed of 5.7 mm/min using a melt tension tester available from Toyo Seiki Seisaku-sho, Ltd. and then winding this strand around a roller having a diameter of 50 mm at a speed of 100 rpm) is 50 mN or more, preferably 120 mN or more.

To prevent the surface-material sheet from being cracked due to a shock, it is preferred to add less than 30 wt %, preferably less than 15 wt % of a hydrogen-added styrene-based thermoplastic elastomer. Specifically, the hydrogen-added styrene-based thermoplastic elastomer is preferably a styrene-ethylene butylene-styrene block copolymer, styrene-ethylene propylene-styrene block copolymer, hydrogenation styrene-butadiene rubber, or mixture thereof whose styrene content is less than 30 wt %, preferably less than 20 wt % and whose MFR at 230° (measured at a test temperature of 230° and a test load of 2.16 kg in accordance with JIS K-7210) is 1.0 to 10 g/10 min, preferably 5.0 g/10 min or less and 1.0 g/10 min or more.

The surface-material sheet may contain an additive. Examples of the additive include inorganic fillers such as silica, mica, talc, calcium carbonate, glass fiber, and carbon fiber, plasticizers, stabilizers, colorants, antistatic agents, flame retardants, and foaming agents.

For example, 50 wt % or less, preferably 30 to 40 wt % of silica, mica, glass fiber, or the like is added to the molding resin.

A molding machine includes the molten-resin extruder 200 and a mold clamping apparatus disposed under the molten-resin extruder 200. The mold clamping apparatus includes split molds 73, mold moving unit (not shown), and blow pressuring means (not shown). The split molds 73 can be moved between open positions and closed positions in directions approximately perpendicular to the lowering direction of a lowering molten parison with the molten parison therebetween. The split molds 73 have cavities in the opposite surfaces thereof. The mold moving unit moves the split molds 73 between the open positions and closed positions in the directions approximately perpendicular to the lowering direction of the molten parison. The blow pressuring means blow-pressurizes an enclosed space formed by closing the split molds 73.

A blow molding method using the molding machine thus configured will be described below.

In short, by converting the rotational motions of the electric motors 216 into the linear motion of the piston 206 through the ball screws, the ring-shaped piston 206 disposed in the molten resin-chargeable space 208 formed in the accumulator 205 is caused to make a vertical motion, and the molten resin in the charging space 208 is extruded from the head 203 having the extrusion port 202 at the lower end 201 thereof.

Specifically, first, the extrusion port 202 is closed by rotating the electric motor 215. Then, the lower plate 210, that is, the ring-shaped piston 206 is moved in the annular space through the vertical motion of the upper plate 211.

More specifically, as shown in FIG. 1, the upper plate 211 is separated from the lower plate 210 and retracted upward by rotating the pair of electric motors 216A, 216B. Then, molten and kneaded resin is charged into the charging space 208 through the charging port 236 with a sufficient charging pressure to push up the ring-shaped piston 206 against the weights of the lower plate 210 and ring-shaped piston 206 in the charging space 208.

While the molten resin is charged into the molten-resin charging space 208, the molten resin in the charging space 208 receives downward back pressure based on the weights of the lower plate 210 and piston 206. For this reason, the charging pressure of the molten resin is set to a sufficient value to push up the lower plate 210. Thus, the molten resin is charged into the charging space 208 while receiving resistance but pushing away the piston 206 upward, allowing the molten resin to be smoothly charged into all parts of the charging space 208 of the accumulator 205.

At this time, it is only necessary to control the pressure with which the molten resin is charged into the charging space 208 so that the charging pressure of the molten resin becomes a sufficient value to push up the lower plate 210.

Then, as shown in FIG. 2, the molten resin is charged into the charging space 208 while position-detecting the level of the lower plate 210 using the level detector 212. When the level of the lower plate 210 reaches the target level, a descent of the upper plate 211 is started by driving the pair of electric motors 216A, 216B.

Note that when the lower plate 210 surface-contacts the upper plate 211 after retracting the upper plate 211 to the target level, a descent of the upper plate 211 may be started by driving the pair of electric motors 216A, 216B.

Then, the opening area of the extrusion port 202 is adjusted by rotating the electric motor 215 and then, as shown in FIG. 3, the upper plate 211 is moved downward by rotating the pair of electric motors 216A, 216B with the upper plate 211 and lower plate 210 surface-contacting each other. Thus, the piston 206 is moved downward in the charging space 208, and the molten resin is extruded from the extrusion port 202.

More specifically, the ball nuts 218A, 218B, nut supporting plate 266, tube 262, and upper plate 211 are pressed down through the ball screws 214A, 214B by rotating the pair of electric motors 216A, 216B. That is, the rotational motions of the pair of electric motors 216A, 216B are converted into a linear motion through the screwing relationship between the ball screws 214A, 214B and the ball nuts 218A, 218B secured to the nut supporting plate 266 and thus the upper plate 211 is pressed down. This pressing force is transmitted to the ring-shaped piston 206 through the lower plate 210 and piston rods 220. Thus, the molten resin is pressed down, and a cylindrical parison is extruded from the annular extrusion port 202.

Next, a molding method will be described. In short, the molding method includes a step of melting and kneading thermoplastic resin, a step of storing a predetermined amount of the molten and kneaded thermoplastic resin, a step of intermittently extruding the stored thermoplastic resin in a predetermined extrusion amount per unit time using the molten-resin extruder 200 so that the thermoplastic resin lowers from the extrusion port 202 in the form of a molten parison and thus extruding the molten parison from the extrusion port 202 downward at a predetermined extrusion speed, a step of locating the extruded molten parison on sides of the split molds 73, a step of forming an enclosed space in the split molds 73 by closing the split molds 73 so that the molten parison is sandwiched therebetween, and a step of molding the molten parison into a shape corresponding to the shapes of the molds by blow-pressurizing the formed enclosed space and pressing the molten parison against the molds.

Figure 4:
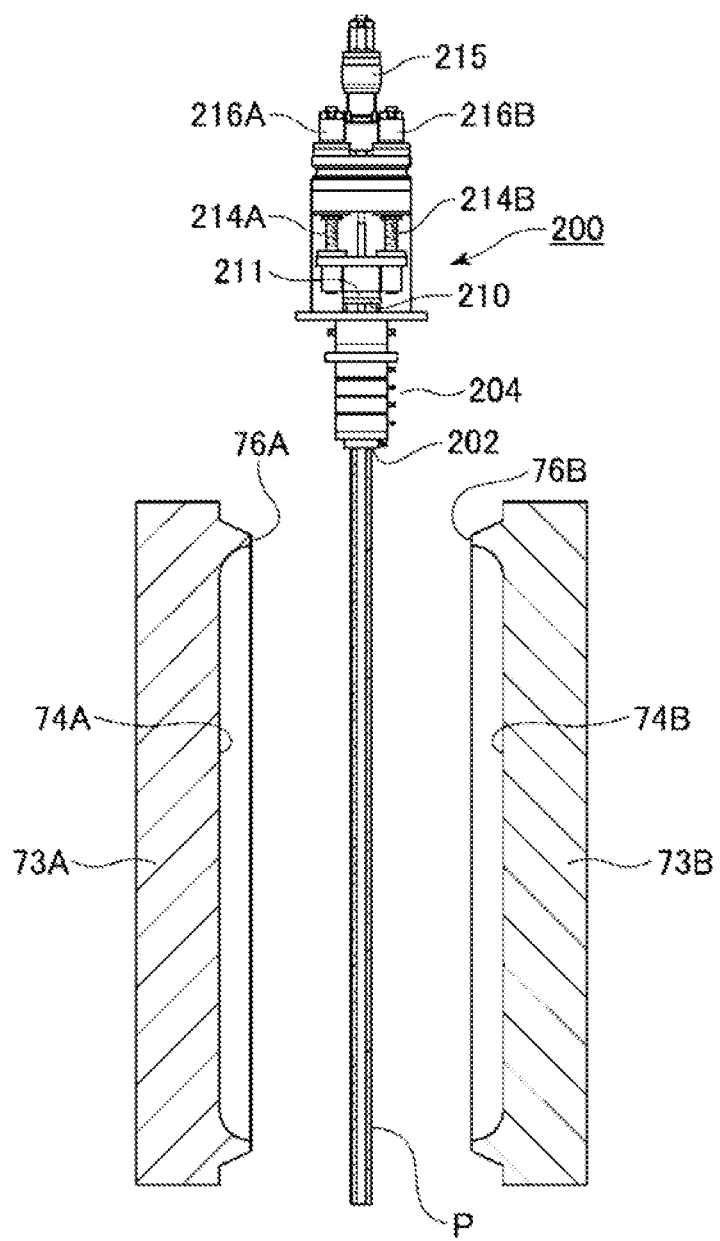
FIG. 4 is a drawing showing a state before split molds are closed in a blow molding method of a first embodiment.
Figure 5:
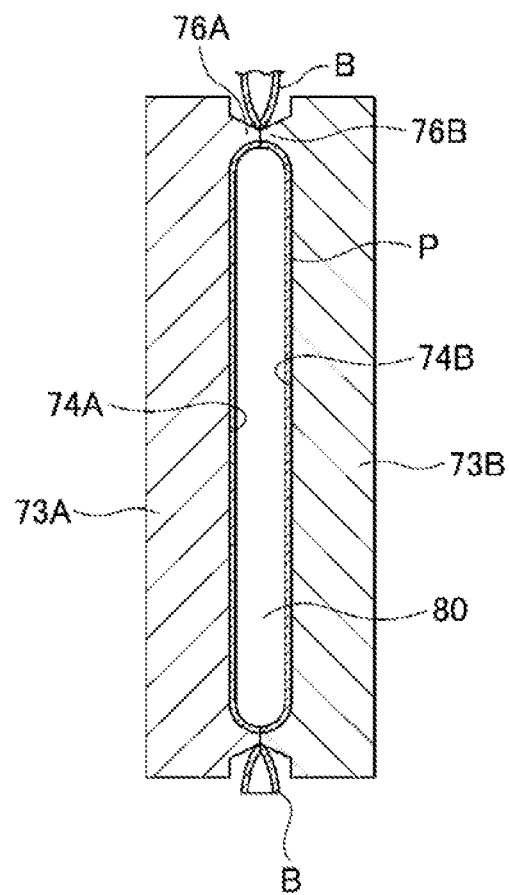
FIG. 5 is a drawing showing a state in which the split molds are closed in the blow molding method of the first embodiment.

More specifically, as shown in FIG. 4, first, a molten cylindrical parison P is extruded from the extrusion port 202 of the extruder 200 vertically downward and fed between the two split molds 73 located in the open positions. Then, as shown in FIG. 5, the two split molds 73 are closed by moving them from the open positions to the closed positions. Thus, an enclosed space 80 is formed.

Then, blow molding is performed through the enclosed space 80 and thus the parison P in the enclosed space is pressed against cavities 74 and shaped in accordance with the cavities 74.

More specifically, in this blow molding, as in known methods, a blow pin (not shown) is inserted into a core material 13 and then a pressurized fluid is introduced thereinto. Thus, the parison P is pressed against the cavities 74.

Thus, pinch-off parts 76 of the split molds 73 contact the molten cylindrical parison P. Thus, parting line PL are formed on the peripheries of the cylindrical parison P, and the parison P is welded. As a result, a molded product containing a hollow is obtained.

Figure 6:
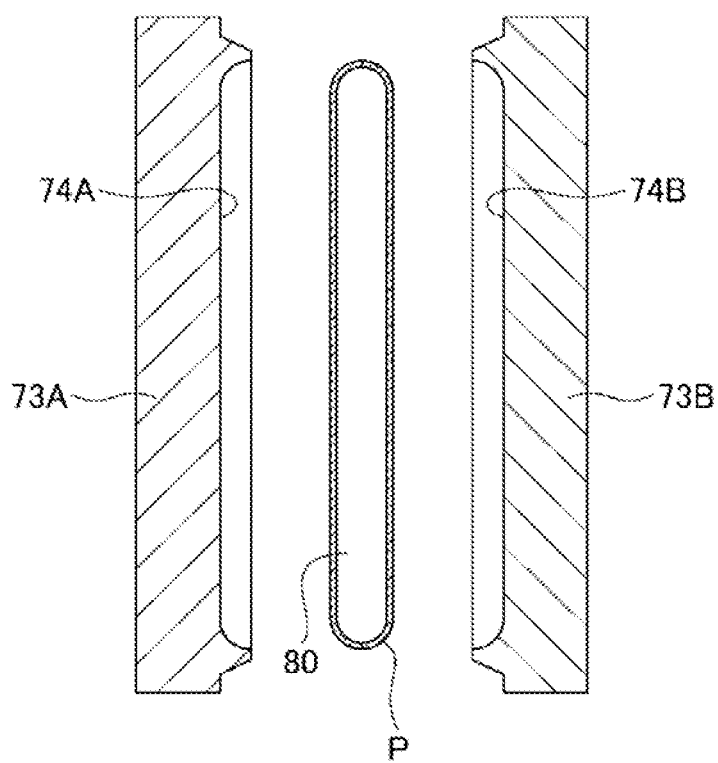
FIG. 6 is a drawing showing a state in which the split molds are opened in the blow molding method of the first embodiment.

Then, as shown in FIG. 6, the two split molds 73 are opened by moving them from the closed positions to the open positions using a mold driver. A fin B is eliminated from the mold product, and the resulting molded product is removed from between the two split molds 73.

Thus, the blow molding is complete.

Assume that a molded product is repeatedly produced in each shot using extruded molten resin. If a sufficient amount of molten resin is not charged in the extrusion preparation step or it takes time to charge a sufficient amount of molten resin in that step, it may be difficult to efficiently perform molding in the subsequent molding step or molding failure may occur depending on the temperature or extrusion amount of the molten resin in that step. The above blow molding method, on the other hand, allows for efficient molding without causing such a problem in the extrusion preparation step or without causing a molding failure.

According to the molten-resin extrusion method thus configured, by converting the rotational motions of the electric motors 216 into the linear motion of the piston 206 through the ball screws, the piston 206 disposed in the molten resin-chargeable space 208 in the accumulator 205 is caused to make a vertical motion. Thus, the molten resin can be charged into the charging space 208 in the accumulator 205, and the charged molten resin can be extruded from the extrusion port 202 formed at the lower end 201.

More specifically, the lower plate 210 is disposed above the accumulator 205 and coupled to the piston 206 from above, and the upper plate 211 is connected to the electric motors 216 through the screwing relationship and is disposed above the lower plate 210 so as to be able to surface-contact the lower plate 210. The upper plate 211 and lower plate 210 are not engaged with each other. In charging molten resin, the upper plate 211 is separated from the lower plate 210 and retracted upward by rotating the electric motors 216; in extruding the molten resin, the rotational motion of the electric motors 216 is converted into the downward linear motions of the lower plate 210 and piston 206 through the upper plate and thus the upper plate is moved downward with the upper plate and lower plate surface-contacting each other.

(2) Second Embodiment

A second embodiment of the present invention will be described below with reference to FIGS. 7 to 11. In the following description, elements similar to those of the first embodiment are given similar reference signs and will not be described. Now, characteristics of the present embodiment will be described in detail.

In the present embodiment, as in the first embodiment, molding is performed by extruding molten resin downward using a molten-resin extruder similar to that of the first embodiment. The second embodiment of the present invention is characterized by a method and machine for molding molten resin.

More specifically, the molding method of the first embodiment includes forming an enclosed space in split molds by extruding a molten parison downward, sandwiching the molten parison between the molds, and closing the molds and then performing blow molding by blow-pressurizing the enclosed space and thus pressing the molten parison against the molds; the molding method of the present embodiment includes extruding two molten resin sheets downward, forming an enclosed space between a pair of split molds and the molten resin sheets, shaping the molten resin sheets by adsorbing the molten resin sheets from the mold sides, and welding the peripheries of the two molten resin sheets to each other by closing the pair of splits molds.

Since the difference between the first embodiment and the present embodiment is only whether the molten resin is a parison or resin sheet, the molten-resin extruder of the present embodiment will not be described. Now, the method and machine for molding molten resin will be described in detail.

The molding machine of the present embodiment includes a molten-resin extruder 200 similar to that of the first embodiment, a resin-sheet forming apparatus that forms extruded molten resin into a resin sheet, and a mold clamping apparatus disposed under the molten-resin extruder 200. The mold clamping apparatus roughly includes a pair of split molds that can be moved between open positions and closed positions in directions approximately perpendicular to the lowering direction of a lowering molten resin sheet with the molten resin sheet therebetween the molten resin sheet and that have cavities in the opposite surfaces thereof, mold moving unit that moves the pair of split molds between the open positions and closed positions in the directions approximately perpendicular to the lowering direction of the molten resin sheet, and decompression unit that decompresses an enclosed space formed between the molten resin sheet disposed between the pair of split molds located in the open positions and the pair of split molds. The resin-sheet forming apparatus consists of T dies 71 disposed so as to communicate with lower portions of extrusion ports of the molten-resin extruder 200. Each T die 71 has a flat, rectangular extrusion slit 34 at the lower end 201 thereof.

Figure 7:
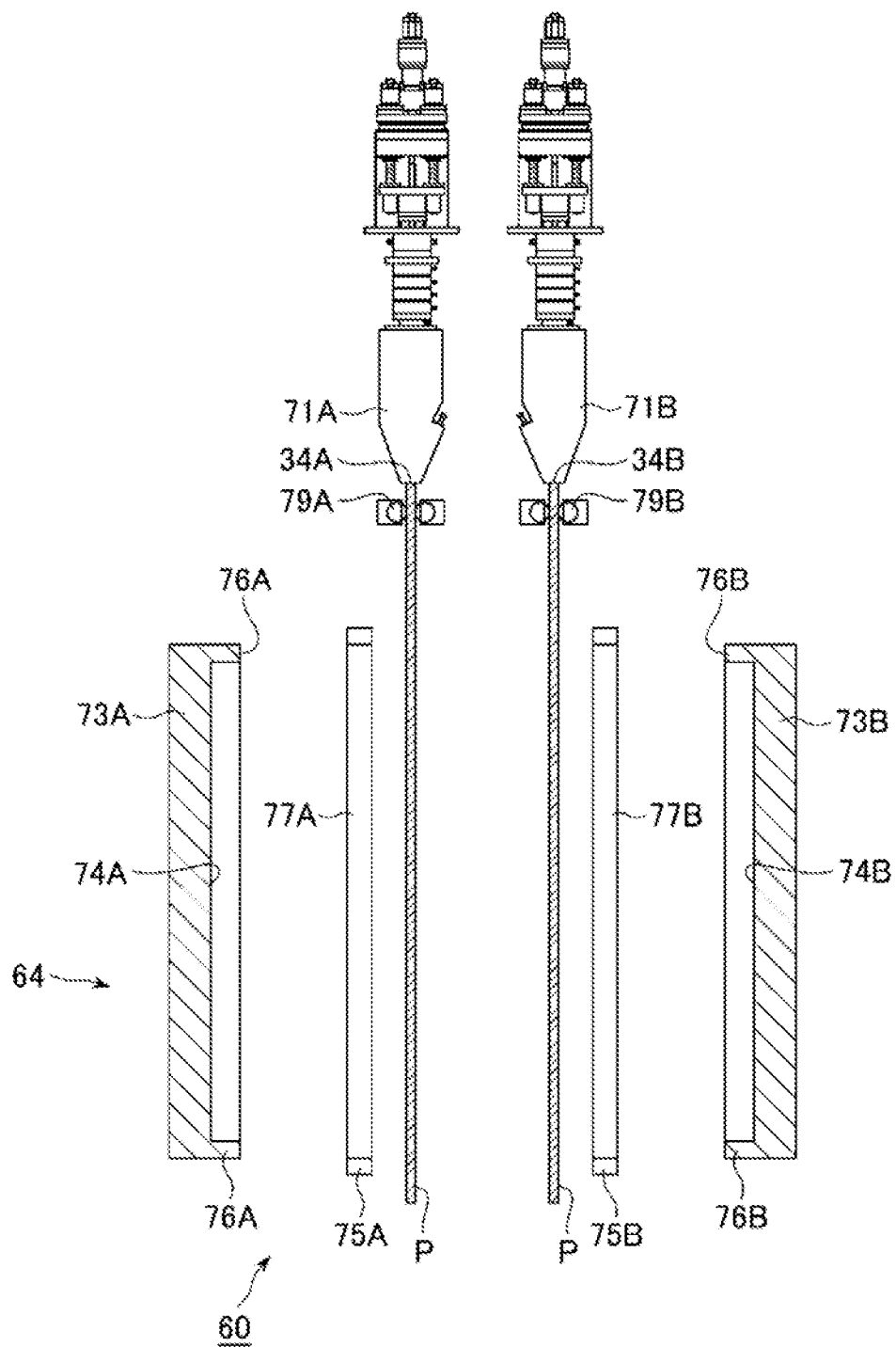
FIG. 7 is a drawing schematically showing a molding machine in a molding method of a second embodiment.

More specifically, as shown in FIG. 7, a sandwich-panel molding machine 60 includes an extruder 200 and a mold clamping apparatus 64 disposed under the extruder 200. The sandwich-panel molding machine 60 feeds a molten parison P extruded from the extruder 200 to the mold clamping apparatus 64 and molds the molten parison P using the mold clamping apparatus 64.

The extruder 200 is similar to that of the first embodiment and feeds molten resin to the T dies 71, which then extrude sheet parisons P through the die slits (not shown). Each sheet parisons P is fed downward while being compressed by a pair of spaced rollers 79 and is hung between the split molds 73. Thus, each sheet parison P is disposed between the split molds 73 without wrinkles or slack.

Figure 13:
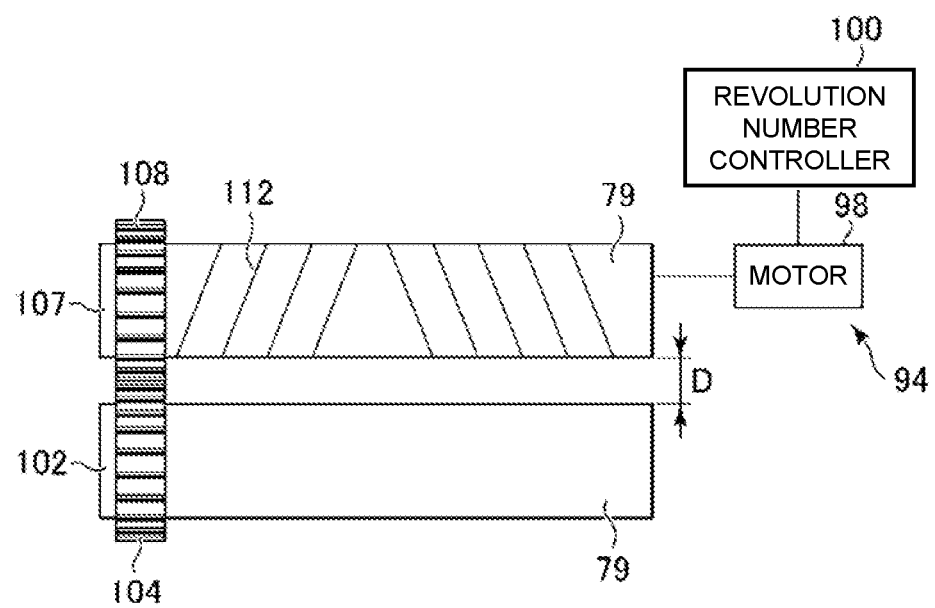
FIG. 13 is a schematic plan view showing the pair of rollers of the resin molded product forming apparatus of the second embodiment and vicinities thereof.

Referring to FIGS. 12A, 12B, and 13, the rotation axes of the pair of rollers 79 are disposed under the extrusion slits 34 so as to be parallel with each other and approximately horizontal. One of the pair of rollers 79 is a driving roller 79A, and the other is a driven roller 79B. More specifically, as shown in FIG. 7, the pair of rollers 79 are disposed so as to be line-symmetrical with respect to the resin sheet extruded from the extrusion slit 34 so as to hang down. The diameter and axial length of each roller are appropriately set in accordance with the extrusion speed of the resin sheet to be molded, the length and width of the sheet in the extrusion direction, the type of the resin, and the like. As will be described later, in order to smoothly feed the resin sheet downward by the rotation of the pair of rollers 79 with the resin sheet sandwiched therebetween, the diameter of the driving roller 79A is preferably slightly larger than that of the driven roller 79B. The diameters of the rollers are preferably in a range of 50 to 300 mm. If the curvatures of the rollers are too large or too small, the sheet parison wound be unfavorably twined around the rollers when the rollers contact the sheet parison.

The driving roller 79A is provided with roller driving unit 94 and roller moving unit 96. The roller driving unit 94 allows the driving roller 79A to rotate around the axial direction thereof. On the other hand, the roller moving unit 96 moves the driving roller 79A in such a manner that the driving roller 79A approaches or leaves the driven roller 79B while keeping a parallel positional relationship with the driven roller 79B in a plane containing the pair of rollers 79.

More specifically, the roller driving unit 94 is a driving motor 98 connected to the driving roller 79A. The driving motor 98 transmits the rotational torque thereof to the driving roller 79A, for example, through a gear deceleration mechanism (not shown). The driving motor 98 is a known conventional driving motor and may be provided with a revolution number controller 100 that is able to control the number of revolutions of the driving motor 98. The revolution number controller 100 is, for example, a revolution number controller that controls the value of the current supplied to the electric motor. As will be described later, it controls the relative speed difference between the extrusion speed at which the resin sheet is extruded from the extrusion slit 34 and the feeding speed at which the resin sheet is fed downward by rotating the pair of rollers 79, in accordance with the extrusion speed of the resin sheet. For example, if a sheet parison P having a length of 2000 mm is fed in the feeding direction for 15 s using a pair of rollers having a diameter of 100 mm, the rollers would rotate about 6.4 times at a rotational speed of about 25.5 rpm in one shot of 15 s. By increasing or reducing the rotational speed of the rollers, the feeding speed of the parison P, which is a resin sheet, can be easily controlled.

As shown in FIG. 13, the driven roller 79B has a first gear 104 that can rotate around the rotational axis of the roller over an end peripheral surface 102 of the roller so that the driven roller 79B is rotationally driven in conjunction with the driving roller 79A. On the other hand, the driving roller 79A has a second gear 108 that can rotate around the rotational axis of the roller over an end peripheral surface 107 of the roller and that is engaged with the first gear 104.

As shown in FIG. 12, the roller moving unit 96 is a piston-tube mechanism. The front end of a piston rod 109 is coupled to a cover 117 that supports the driving roller 79A in such a manner that the driving roller 79A can rotate around the axial direction thereof. For example, by controlling the air pressure, a piston 113 is slid with respect to a tube 115 and thus the driving roller 79A is moved horizontally. Thus, the distance between the pair of rollers 79 can be adjusted. In this case, as will be described later, before the lowest portion of the resin sheet is fed between the pair of rollers 79, the distance between the pair of rollers 79 (a distance D1 in FIG. 12A; the open position) is made larger than the thickness of the resin sheet to be fed so that the resin sheet is smoothly fed between the pair of rollers 79; then, the distance between the pair of rollers 79 is reduced so that the resin sheet is sandwiched between the pair of rollers 79 (a distance D2 in FIG. 12B; the closed position); and the resin sheet is fed downward by rotating the rollers. The stroke of the piston 113 is set such that it becomes the distance between the open position and close position. Also, the air pressure may be controlled to control the pressing force working on the resin sheet from the rollers when the resin sheet is passed between the pair of rollers 79. Preferably, the range of the pressing force is determined such that the resin sheet is reliably fed downward while preventing a slip between the surfaces of the pair of rollers 79 and the surface of the resin sheet and preventing the resin sheet from being teared by the pair of rollers 79. While the pressing force depends on the type of the resin, it is, for example, 0.05 to 6 MPa.

The extrusion ability of the extruder 200 is appropriately selected in terms of the size of surface-material sheets 12 to be molded and the prevention of draw-down of the parison P. More specifically, the speed at which the resin is extruded from the die slit is several hundred kg/h or more, more preferably 700 kg/h or more in practical terms. Also, the parison P extrusion step is preferably as short as possible in terms of the prevention of draw-down of the parison P. Although the duration of the extrusion step depends on the type of the resin and the MFR value, the extrusion step is typically preferably complete within 40 s, more preferably within 30 s. For this reason, the amount of extrusion of the thermoplastic resin from the die slit per unit area and per unit time is 50 kg/time $cm^2$ or more, more preferably 60 kg/time $cm^2$ or more.

The die slit is disposed vertically downward. The sheet parison extruded from the die slit is fed vertically downward so as to hang from the die slit as it is. By making the width of the die slit variable, the thickness of the sheet parison P can be charged.

As with the extruder 200, the mold clamping apparatus 64 is of known conventional type and will not be described in detail. The mold clamping apparatus 64 includes two split molds 73 and a mold driver that moves the two split molds 73 between the open positions and closed positions in directions approximately perpendicular to the feeding direction of the molten sheet parison P.

The two split molds 73 are disposed in such a manner that cavities 74 thereof are opposite to each other, and the cavities 74 are disposed so as to be directed in an approximately vertical direction. The surfaces of the cavities 74 are provided with recesses and protrusions corresponding to the external shapes and surface shapes of the surface-material sheets 12 to be molded from molten sheet parisons P.

The two split molds 73 have annular pinch-off parts 76 around the cavities 74. Each pinch-off part 76 protrudes toward the opposite mold 73. Thus, when the two split molds 73 are closed, the ends of the pinch-off parts 76 contact each other, forming parting line PL on the peripheries of the molten sheet parisons P.

A pair of frame members 75 are disposed between the two split molds 73 so as to be able to insert the pair of molds 73 and to be approximately parallel with the cavities 74. The pair of frame members 75 have openings 77 and are horizontally moved by a frame member driver (not shown). Thus, the pair of frame members 75 can be moved to the corresponding parisons P, caused to hold the parisons P, and moved in the opposite direction in this state until the ends of the pinch-off parts 76 of the corresponding molds 73 contact the surfaces of the parisons P through the openings 77.

The mold driver is similar to a conventional one and will not be described. The two split molds 73 are driven by the mold driver. In the open positions of the molds 73, the two molten sheet parisons P can be disposed between the two split molds 73 so as to be spaced from each other; in the closed positions thereof, the annular pinch-off parts 76 of the two split molds 73 contact each other, forming an enclosed space in the two split molds 73. Note that the closed positions are, for example, the positions of the center lines of the two molten sheet parisons P. The molds 73 are driven by the mold driver and thus moved from the open positions to closed positions.

In the present invention, examples of the material of the core material 13 include polyolefins (e.g., polypropylene, high-density polyethylene) which are monopolymers or copolymers of olefins such as ethylene, propylene, butene, isoprene pentene, and methyl pentene, polyamide, polystyrene, polyvinyl chloride, polyacrylonitrile, acrylic derivatives such as ethylene-ethyl acrylate copolymer, polycarbonate, vinyl acetate copolymers such as ethylene-vinyl acetate copolymer, ionomer, terpolymers such as ethylene-propylene-diene, and thermoplastic resins such as ABS resin, polyolefin oxide, and polyacetal.

One of these materials may be used alone, or a mixture of two or more thereof may be used. Among the thermoplastic resins, olefin-based resins or resins containing an olefin-based resin as a main component, polypropylene-based resins or resins containing a polypropylene-based resin as a main component are particularly preferred, since the weldability to a fiber layer, mechanical strength, and moldability thereof are well-balanced. The core material 13 may contain an additive. Examples of the additive include inorganic fillers such as silica, mica, talc, calcium carbonate, glass fiber, and carbon fiber, plasticizers, stabilizers, colorants, antistatic agents, flame retardants, and foaming agents.

The surface of any surface-material sheet 12 may be provided with a decorative-material sheet 14. The decorative-material sheet 14 is disposed in order to improve appearance, show decorativeness, and protect an object in contact with a molded product (e.g., in the case of a cargo floor board, a cargo placed on the upper surface of the board). The material of the decorative-material sheet 14 is, for example, a fiber surface material, sheet-shaped surface material or film-shaped surface material. Examples of the fiber surface material include synthetic fibers such as polyester, polypropylene, polyamide, polyurethane, acrylic, and vinylon, semi-synthetic fibers such as acetate and rayon, regenerated fibers such as viscose rayon and cuprammonium rayon, natural fibers such as cotton, hemp, wool, and silk, and blend fibers thereof.

Among these materials, polypropylene or polyester are preferred, polyester is more preferred in terms of feeling, durability, and moldability. For example, it is preferred to use a combination of staple yarn having a fineness of 3 to 15 denier and a fiber length of about 2 to 5 inches such as polyester with 3 to 5 denier×50 to 100 mm and multifilament such as thin, soft filament bundle polyester with about 150 to 1000 denier/30 to 200 filaments=about 5 denier×30 to 200 or thick monofilament such as polyester with 400 to 800 denier/1 filament.

Examples of the weave of the decorative-material sheet 14 include nonwoven fabrics, woven fabrics, knitted fabrics, and fabrics obtained by napping these fabrics. Examples of the woven fabrics include plain weaves where the warp and weft cross each other sequentially vertically, as well as variation weaves where the warp and weft cross each other while skipping some threads. Among these, nonwoven fabrics are preferred, since they extend without directivity and therefore are easily molded into a three-dimensional shape and provide an excellent surface feeling. As used herein, the term "nonwoven fabric" refers to a cloth product obtained by forming webs by layering fibers in parallel or alternately or distributing fibers randomly and then joining the webs. A nonwoven fabric produced by needlepunching is particularly preferred in terms of the three-dimensional-shape reproducibility and appearance characteristics of a molded product. A nonwoven fabric produced by needlepunching has low strength and high ductility and becomes deformed in any direction to a large extent compared to a woven fabric. For this reason, in order to improve the strength of a nonwoven fabric and to stabilize the size, it is more preferred to apply a binder to a woven fabric or to punch webs and the nonwoven fabric using an overlapping needle. In these respects, the decorative-material sheet 14 is more preferably a polypropylene nonwoven fabric or polyester nonwoven fabric. Since the decorative-material sheet 14 itself is thermoplastic, it can be used in other applications by heating and deforming it after being peeled and reclaimed. For example, if the main resin layer of the molded product is formed of polypropylene and the decorative-material sheet 14 is formed of a polypropylene nonwoven fabric, the molded product is easily recycled, since the main resin layer and the decorative-material sheet 14 are formed of the same material.

On the other hand, if the decorative-material sheet 14 is formed of a polyester nonwoven fabric, the main resin layer formed of polypropylene and the fiber surface material have different melting points. For this reason, when the decorative-material sheet 14 is bonded to the molded product, problems such as alteration or deformation due to heat and a failure to bond the decorative-material sheet 14 to a proper position can be suppressed. In this case, excellent moldability, rigidity, appearance, and durability are obtained. The tensile strength of the decorative-material sheet 14 is preferably 15 kg/cm$^2$ or more in terms of the three-dimensional shape reproducibility and moldability. The ductility thereof is preferably 30% or more. Note that the above tensile strength value and ductility value are those obtained by making measurements in accordance with JIS-K-7113 at a temperature of 20° C. Examples of the sheet-shaped surface material or film-shaped surface material include a thermoplastic elastomer, an embossed resin layer, a resin layer having a print layer attached to the outer surface thereof, synthetic leather, and a non-slip mesh-shaped surface layer.

Next, a method for molding a sandwich panel 10 will be described. In short, this method includes a step of melting and kneading thermoplastic resin, a step of storing a predetermined amount of the molten and kneaded thermoplastic resin, a step of intermittently extruding the stored thermoplastic resin from the extrusion port 202 downward in a predetermined extrusion amount per unit time using the molten-resin extruder 200 and thus extruding the molten thermoplastic resin from the extrusion port 202 downward at a predetermined extrusion speed, a step of forming the extruded molten resin into a molten resin sheet, a step of locating the melt resin sheet between the pair of the opened split molds, a step of forming an enclosed space between the molten resin sheet and the pair of split molds, and a step of molding the molten resin sheet into a shape corresponding to the shapes of the molds by decompressing the formed enclosed space and/or pressing the molten resin sheet against the molds.

More specifically, first, the sheet-shaped decorative-material sheet 14 is inserted between one split mold 73 and one frame member 75 from a side of the split molds 73. The sheet-shaped decorative-material sheet 14 is temporarily fastened using a temporary fastening pin (not shown) disposed on the one split mold 73 so as to cover the cavity 74 of the one split mold 73.

Then, two molten sheet parisons P are extruded from the die slits vertically downward and fed between the two split molds 73. Simultaneously the pair of frame members 75 are moved to the corresponding sheet parisons P by the frame member driver.

Then, by driving the piston-tube mechanism 96, the pair of rollers 79 are moved to the open position (that is, the distance between the rollers 79 is increased) so that the lowest portions of the molten resin sheets extruded downward are smoothly fed between the rollers 79. Note that the timing when the distance between the rollers 79 is made greater than the thickness of the resin sheet need not be after starting to extrude the resin sheet and may be the time point when secondary molding is complete in each shot.

Then, by driving the piston-tube mechanism 96, the pair of rollers 79 are brought close to each other and moved to the closed position (that is, the distance between the rollers 79 is reduced). Thus, the resin sheet is sandwiched between the rollers and fed downward by rotating the rollers. While the swelled resin sheet is fed by the pair of rollers 79 by rotating the rollers 79, the rotational speed of the rollers is controlled so that the speed at which the pair of rollers 79 feed the resin sheet downward becomes equal to or more than the extrusion speed of the thermoplastic resin sheet.

More specifically, as the swelled resin sheet is fed by the pair of rollers 79 downward, the length of the vertically lowering resin sheet is increased. Thus, the thicknesses of higher portions of the lowering resin sheet are reduced due to the self-weight of the resin sheet (draw-down or neck-in). For this reason, the rotational speed of the pair of rollers 79 is controlled so that the feeding speed of the rollers 79 becomes equal to or higher than the extrusion speed. Thus, the resin sheet is pulled down by the pair of rollers 79 and thus extended and thinned.

Note that the with a lapse of time, the rotational speed of the rollers is reduced so that the feeding speed comes close to the extrusion speed of the thermoplastic resin sheet.

Figure 8:
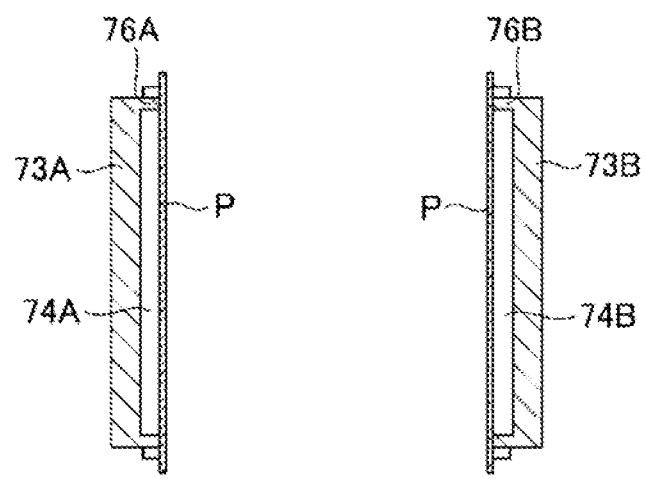
FIG. 8 is a drawing a state in which a surface-material sheet is in contact with split molds in the molding method of the second embodiment.

Then, as shown in FIG. 8, the frame members 75 holding the sheet parisons P are moved toward the corresponding split molds 73 until the pinch-off parts 76 of the molds 73 contact the surfaces opposite to the cavities 74, of the sheet parisons P through the openings 77 of the frame members 75. Thus, an enclosed space is formed by the surfaces opposite to the cavities 74, of the sheet parisons P, the pinch-off parts 76, and the cavities 74.

Figure 9:
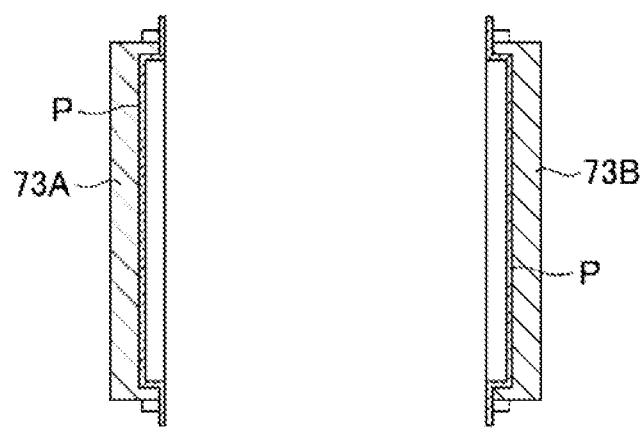
FIG. 9 is a drawing a state in which a surface-material sheet is shaped in the molding method of the second embodiment.

Then, as shown in FIG. 9, the inside of the enclosed space is adsorbed through the split molds 73. Thus, the corresponding sheet parisons P are pressed against the cavities 74 and formed into shapes corresponding to the cavities 74. Note that the left sheet parison P in FIG. 9 is not only shaped, but also welded to the decorative-material sheet 14 interposed between the sheet parison P and cavity 74.

Figure 10:
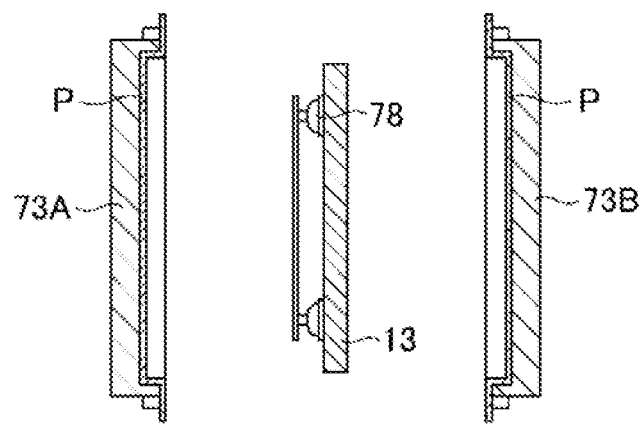
FIG. 10 is a drawing a state in which a core-material sheet is located between the split molds in the molding method of the second embodiment.

Then, as shown in FIG. 10, the core material 13 held by a suction pad 78 of a manipulator (not shown) is inserted between the two split molds 73 from a side.

Then, by moving the manipulator toward the right split mold 73 horizontally, the core material 13 is pressed against the sheet parison P adsorbed by the cavity 74 of the right split mold 73. Thus, the core material 13 is welded to the sheet parison P. Then, a preparation for mold clamping is made by desorbing the suction pad 78 from the core material 13 and pulling the manipulator from between the two split molds 73.

Figure 11:
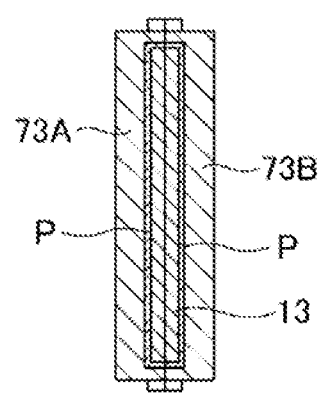
FIG. 11 is a drawing a state in which the split molds are closed in the molding method of the second embodiment.

Then, as shown in FIG. 11, the mold driver closes the two split molds 73 by moving the split molds from the open positions to the closed positions. Thus, the core material 13 welded to one sheet parison P (the right one in FIG. 11) is welded to the other sheet parison P. Also, the peripheries of the sheet parisons P are welded to each other, forming parting line PL. Note that during the closing, the core material 13 which is previously molded and cooled unlike the surface-material sheets 12 is welded to the molten surface-material sheets 12. For this reason, the core material 13 is previously positioned so that it is not deformed by closing.

In this way, the sandwich panel 10 where the decorative-material sheet 14, surface-material sheet 12, core material 13, and surface-material sheet 12 are stacked is completed.

Then, the two split molds 73 are opened; the cavities 74 are separated from the completed sandwich panel 10; and fins B formed around the parting line PL are eliminated.

Thus, the molding of the blow molding is complete.

According to the above molding method, advantageous effects similar to those of the blow molding method of the first embodiment are obtained. That is, molding can be performed efficiently without causing a failure in the extrusion preparation step and without causing a molding failure.

While the embodiments of the present invention have been described in detail, those skilled in the art can make various modifications or changes thereto without departing from the scope of the present invention.

For example, while, in the above embodiments, the pair of electric motors are driven in conjunction with each other in order to cause the upper plate 211 to make a vertical reciprocating linear motion, other configurations may be used. A single electric motor may be used as long as the upper plate 211 can make a vertical reciprocating linear motion.

For example, while, in the above embodiments, the pair of electric motors are driven in conjunction with each other by providing the center electric motor 215 and the pair of electric motors 216 disposed on the sides of the electric motor 215 with the gears and engaging the three gears with each other, other configurations may be used. A pair of electric motors provided with no gears may be driven in conjunction with each other as long as the upper plate 211 can smoothly make a vertical reciprocating linear motion.

For example, in the above embodiments, in charging the molten resin to push away the lower plate 210 upward, the charging of the molten resin is stopped before the lower plate 210 contacts the upper plate 211. However, other configurations may be used. The following configuration may be used: the charging of the molten resin is stopped at the time point when the lower plate 210 contacts the upper plate 211; and the upper plate 211 is moved downward with the upper plate 211 and lower plate 210 contacting each other by rotating the electric motors and thus the charged molten resin is extruded from the extrusion port of the head.

For example, in the second embodiment, as in the first embodiment, the charging space of the molten-resin extruder 200 and the corresponding piston are annular and the molten resin to be extruded is a parison. However, the charging space of the molten-resin extruder 200 and the corresponding piston need not be annular and the molten resin need not be fed to the T die in the form of a parison as long as the T die is disposed downstream (below) of the molten-resin extruder 200 and the molten resin extruded from the molten-resin extruder 200 is extruded from the die slit in the form of a sheet.

While, in the second embodiment, the thickness of the resin molded product is made uniform by preventing rawdown or neck-in, other configurations may be used. The rotational speed of the pair of rollers may be controlled so that the thickness of the resin molded product shows a desired thickness distribution in the extrusion direction before closing of secondary molding.

While, in the second embodiment, the decorative-material sheet is located between the split molds and then welded to the surface-material sheet by closing the split molds, other configurations may be used. For example, the following configuration may be used: along with a resin sheet for a surface-material sheet, a decorative-material sheet is fed between the pair of rollers; the thickness of the resin sheet is controlled by controlling the rotational speed of the pair of rollers; and the decorative-material sheet is press-fitted to the resin sheet.

While, in the second embodiment, the control of the rotational speed of the rollers is performed independently of the control of the distance between the extrusion slits 34, the control of the rotational speed of the rollers and the control of the distance between the extrusion slits 34 may be performed in conjunction with each other. More specifically, the following communication may be used: by reducing the rotational speed of the rollers with a lapse of time, the speed at which the pair of rollers 79 feed the resin sheet downward is reduced; and by controlling the amount of rotation made by the electric motor 215, the distance between the extrusion slits 34 is increased. In this case, the thickness of the resin sheets extruded from the extrusion slits 34 downward is increased with a lapse of time in primary molding, and the resin sheet extending/thinning effects obtained by the pair of rollers 79 are reduced. Therefore, draw-down or neck-in can be more effectively prevented in higher portions of the resin sheets due to the synergy effect between the increases in the thickness of the resin sheets and the reductions in the resin sheet extending/thinning effects.

The invention claimed is:

1. A molten-resin extruder comprising:
    an accumulator extending vertically and provided with a space coupled to a head, the head having an extrusion port at a lower end thereof, the accumulator including a core configured to adjust opening area of the extrusion port;
    a piston that is fitted to the space and is able to move vertically in the space, wherein a charging space into which a molten resin can be charged is formed under the piston in the space;
    a shaft inserted into the core of the accumulator, the shaft configured to move the core upward and downward to adjust the opening area of the extrusion port;
    a lower plate disposed over the accumulator and coupled to the piston from above;
    a level detector configured to detect a level of the lower plate;
    a screw shaft that extends vertically;
    an electric motor configured to rotationally drive the screw shaft;
    a nut secured to the screw shaft and capable of making a vertical linear motion along the screw shaft, wherein the screw shaft is rotated around a vertical direction by the electric motor; and
    an upper plate coupled to the nut and disposed over the lower plate so as to be able to surface-contact the lower plate, wherein
    the molten-resin extruder comprises only one upper plate, and
    the upper plate and the lower plate respectively include openings through which the shaft passes,
    after the upper plate is retracted upward by the electric motor, the molten resin is charged into the charging space while applying back pressure based on a selfweight of the lower plate to the molten resin in the charging space, and the charged molten resin is extruded from the extrusion port downward.

2. The molten-resin extruder of claim 1, wherein
    the space is a ring-shaped space,
    the piston is a ring-shaped piston having a shape complementary to a shape of the ring-shaped space, and
    the charged molten resin is extruded from the extrusion port downward in the form of a parison.

3. The molten-resin extruder of claim 2, wherein
the lower plate is coupled to the piston through a piston rod, wherein the piston rod extends vertically in the space, and
the level detector comprises:
   a magnet disposed on the piston rod; and
   a magnetic sensor fixed near the piston rod and configured to convert a change in a magnetic field of the magnet into an electric signal and to output the electric signal.

4. The molten-resin extruder of claim 2, wherein
the lower plate is coupled to the piston through a piston rod, wherein the piston rod extends vertically in the space, and
the level detector comprises an infrared sensor fixed near the piston rod and configured to detect a level of the piston rod by detecting that radiant energy of an infrared ray radiated from the piston rod is equal to or higher than a predetermined level.

5. The molten-resin extruder of claim 2, wherein
the upper plate and the lower plate are disposed horizontally, have surface-contact portions having an identical shape, and are disposed in such a manner that peripheries of the surface-contact portions match each other.

6. A molten resin molding machine comprising:
the molten-resin extruder of claim 1;
a resin-sheet forming apparatus configured to form extruded molten resin into a resin sheet;
a mold clamping apparatus disposed under the molten-resin extruder, wherein the mold clamping apparatus comprises:
a pair of split molds configured to be moved in directions perpendicular to a lowering direction of a lowering molten resin sheet between open positions and closed positions with the molten resin sheet interposed between the split molds, the split molds having cavities in opposite surfaces thereof;
a mold moving unit configured to move the pair of split molds in the directions perpendicular to the lowering direction of the molten resin sheet between the open positions and the close positions; and
a decompression unit configured to decompress an enclosed space formed between the molten resin sheet and the pair of split molds, wherein the molten resin sheet is disposed between the pair of split molds located in the open positions and the pair of split molds.

7. The molten resin molding machine of claim 6, wherein
the resin-sheet forming apparatus is a T die disposed so as to communicate with a lower portion of the extrusion port of the molten-resin extruder, and
the T die has a flat, rectangular extrusion slit at a lower end thereof.

8. The molten resin molding machine of claim 6, further comprising:
a pair of rollers positioned in predetermined positions located under the resin-sheet forming apparatus and over the pair of split molds, rotational axes of the rollers being disposed so as to be parallel with each other and horizontal, one of the rollers being a driving roller, the other roller being a driven roller;
a roller driving unit configured to rotationally drive the driving roller;
a roller moving unit configured to move one of the pair of rollers relative to a corresponding roller in a plane containing the pair of rollers or move both the rollers in the plane; and a roller rotational speed controller configured to control a rotational speed of the driving roller so that a speed at which the pair of rollers feed the resin sheet downward becomes equal to or higher than an extrusion speed of the resin sheet, in accordance with the extrusion speed with the resin sheet sandwiched between the pair of rollers.

9. A molten resin blow-molding machine comprising:
the molten-resin extruder of claim 2; and
a mold clamping apparatus disposed under the molten-resin extruder, wherein
the mold clamping apparatus comprises:
split molds configured to be moved between open positions and closed positions in directions perpendicular to a lowering direction of a lowering molten parison with the molten parison interposed between the split molds, the split molds having cavities in opposite surfaces thereof;
a mold moving unit configured to move the split molds in the directions perpendicular to the lowering direction of the molten parison between the open positions and the closed positions; and
a blow pressurizing unit configured to blow-pressurize inside of an enclosed space formed by closing the split molds.

10. A molten resin blow-molding method comprising:
a step of melting and kneading thermoplastic resin;
a step of storing a predetermined amount of the molten and kneaded thermoplastic resin,
a step of intermittently extruding the stored thermoplastic resin in a predetermined extrusion amount per unit time using the molten-resin extruder of claim 2 so that the thermoplastic resin lowers from the extrusion port in the form of a molten parison and thus extruding the molten parison downward from the extrusion port at a predetermined extrusion speed;
a step of locating the extruded molten parison on sides of split molds;
a step of forming an enclosed space in the molds by closing the split molds so that the molten parison is sandwiched therebetween; and
a step of molding the molten parison into a shape corresponding to shapes of the molds by blow-pressurizing the formed enclosed space and pressing the molten parison against the molds.

11. A method using the molten-resin extruder of claim 1 for extruding molten resin in the charging space from the head by converting a rotational motion of the electric motor into a linear motion of the piston disposed in the charging space through a ball screw and thus causing the piston to move vertically, the charging space being a space into which the molten resin can be charged and formed in the accumulator of the molten-resin extruder, the method comprising:
a step of separating the upper plate from the lower plate and retracting the upper plate upward by a rotational motion of the electric motor and then charging the molten resin into the charging space with a sufficient charging pressure to push up the piston against weights of the lower plate and the piston in the charging space, the lower plate being disposed over the accumulator and coupled to the piston from above, the upper plate being engaged with the electric motor and disposed over the lower plate so as to be able to surface-contact the lower plate; and
a step of extruding the molten resin from the extrusion port of the head by moving the upper plate downward with the upper plate and the lower plate surface-contacting each other by the rotational motion of the electric motor and thus moving the piston downward in the charging space.

12. The method for extruding the molten resin of claim 11, wherein the piston is disposed so as to be fitted into a space in the accumulator in the form of a tube and thus the charging space is formed under the piston in the space.

13. The method for extruding the molten resin of claim 12, wherein the molten resin charging step comprises a step of charging the molten resin while detecting a level of the lower plate.

14. The method for extruding the molten resin of claim 13, wherein when the level of the lower plate reaches a target level, a descent of the upper plate is started by driving the electric motor.

15. The method for extruding the molten resin of claim 13, wherein when the upper plate is retracted to a target level and the lower plate surface-contacts the upper plate, a descent of the upper plate is started by driving the electric motor.

16. The method for extruding the molten resin of claim 13, wherein the molten resin charging step further comprises a step of controlling a charging pressure with which the molten resin is charged into the charging space.

17. A method for molding molten resin, comprising:
a step of melting and kneading thermoplastic resin;
a step of storing a predetermined amount of the molten and kneaded thermoplastic resin;
a step of intermittently extruding the stored thermoplastic resin from the extrusion port downward in a predetermined extrusion amount per unit time using the molten-resin extruder of claim 1 and thus extruding the molten thermoplastic resin from the extrusion port downward at a predetermined extrusion speed;
a step of forming the extruded molten thermoplastic resin into a molten resin sheet;
a step of locating the molten resin sheet between a pair of split molds that are opened;
a step of forming an enclosed space between the molten resin sheet and the pair of split molds; and
a step of molding the molten resin sheet into a shape corresponding to shapes of the molds by decompressing the formed enclosed space and/or pressing the molten resin sheet against the molds.

* * * * *